US007311395B2

(12) United States Patent
Vinals-Matas et al.

(10) Patent No.: US 7,311,395 B2
(45) Date of Patent: Dec. 25, 2007

(54) OPTIMIZED INK JET PRINTING OF BARCODES

(75) Inventors: Lluis Vinals-Matas, San Diego, CA (US); Josep-Maria Serra, San Diego, CA (US); Antoni Murcia, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 09/949,456

(22) Filed: Sep. 7, 2001

(65) Prior Publication Data

US 2003/0048460 A1 Mar. 13, 2003

(51) Int. Cl.
*B41J 2/01* (2006.01)
(52) U.S. Cl. .......................... 347/107; 347/40; 347/41; 347/42; 347/43
(58) Field of Classification Search .............. 347/107, 347/40–43
See application file for complete search history.

(56) References Cited

U.S. PATENT DOCUMENTS

| 3,787,881 | A | * | 1/1974 | Duffield | ...................... 347/107 |
|---|---|---|---|---|---|
| 4,027,586 | A | | 6/1977 | Hubbard | |
| 4,762,063 | A | | 8/1988 | Yeagle | |
| 5,023,437 | A | | 6/1991 | Speicher | |
| 5,767,889 | A | | 6/1998 | Ackley | |
| 5,835,615 | A | | 11/1998 | Lubow et al. | |
| 6,032,863 | A | | 3/2000 | Nethery, III | |
| 6,086,185 | A | * | 7/2000 | Inui et al. | ...................... 347/43 |

FOREIGN PATENT DOCUMENTS

| EP | 0590854 | 4/1994 |
|---|---|---|
| EP | 0667242 | 8/1995 |
| EP | 0801118 | 10/1997 |
| EP | 0837423 | 4/1998 |
| EP | 1079327 | 2/2001 |
| EP | 0997840 | 5/2001 |
| EP | 1126694 | 8/2001 |
| WO | WO99/48037 | 9/1999 |

OTHER PUBLICATIONS

European Search Report dated Jan. 23, 2003.

* cited by examiner

*Primary Examiner*—Stepehen Meier
*Assistant Examiner*—Leonard Liang

(57) ABSTRACT

Inkjet printing of barcodes is enhanced by several methods. In a printhead having two staggered columns of nozzles, using only the even (or odd) column enhances resolution of a vertical barcode element. Filling interior portions of the barcode element with the odd (or even) column improves barcode appearance. Barcode swelling, due to ink migration after application, is reduced by use of a depletion matrix to lessen the quantity of ink applied. Application of the depletion matrix to the edges of the barcode elements resists swelling where resolution is most required. Where a printing mask is applied to the edges of the barcode elements, the edges may be printed only by one column of printhead nozzles, or only during one direction of printhead movement, or both. Alternately, removal of one or more pixels along the edge of a barcode element allows each barcode element to swell to the desired size.

20 Claims, 7 Drawing Sheets

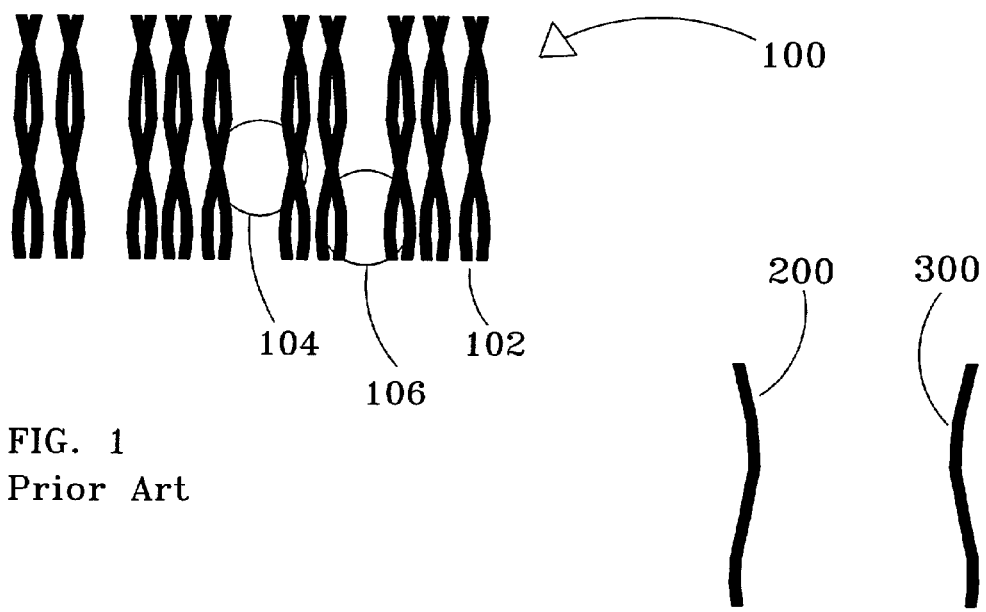
FIG. 1
Prior Art
FIG. 2    FIG. 3
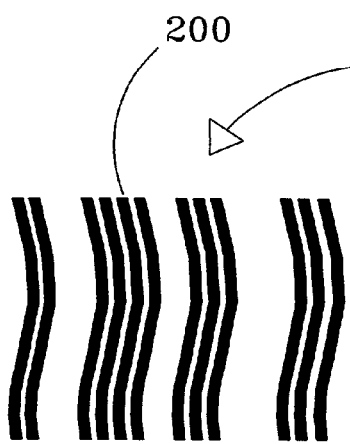
FIG. 4
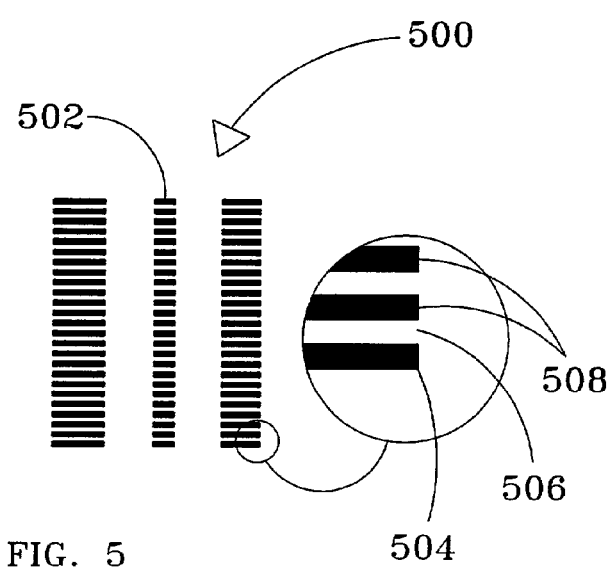
FIG. 5

OPTIMIZED INK JET PRINTING OF BARCODES

TECHNICAL FIELD

This disclosure relates to techniques by which the inkjet printing of barcodes may be optimized.

BACKGROUND

Barcodes are used in many applications to convey information. For example, barcodes are used in the UPC (Universal Product Code) that allows a checkout scanner to operate in a retail sales setting. However, the use of barcodes is becoming far more extensive. For example, while many documents are intended to convey information to people, by adding a barcode to the document, the document may also convey information to a machine. Accordingly, barcodes are included within more and more documents.

Unfortunately, in some applications the information within the barcode may be corrupted due to the method by which the barcode was printed. As a result, there is a need to print bar codes with greater accuracy, so that information will not be lost.

SUMMARY

A system and method is disclosed that optimizes the printing of barcodes by an inkjet printer. A plurality of techniques interact synergistically to produce sharper edges on barcode elements and to prevent barcode growth after ink application. The techniques address single pen printheads, multi-pen printheads, black ink barcodes, composite black ink barcodes and color barcodes.

BRIEF DESCRIPTION OF THE DRAWINGS

The same numbers are used throughout the drawings to reference like features and components.

FIG. 1, Prior Art, is an enlarged and exaggerated illustration of a barcode, showing flaws that may result in barcode reader errors.

FIG. 2 is an enlarged and exaggerated illustration of a barcode element printed by only the even nozzles within a printhead.

FIG. 3 is an enlarged and exaggerated illustration of a barcode element printed by only the odd nozzles within a printhead.

FIG. 4 is an illustration of a barcode resulting from use of only the even nozzles of a printhead.

FIG. 5 is an illustration of a striated barcode, printed with only even nozzles from a staggered printhead.

DETAILED DESCRIPTION

Figure 6:
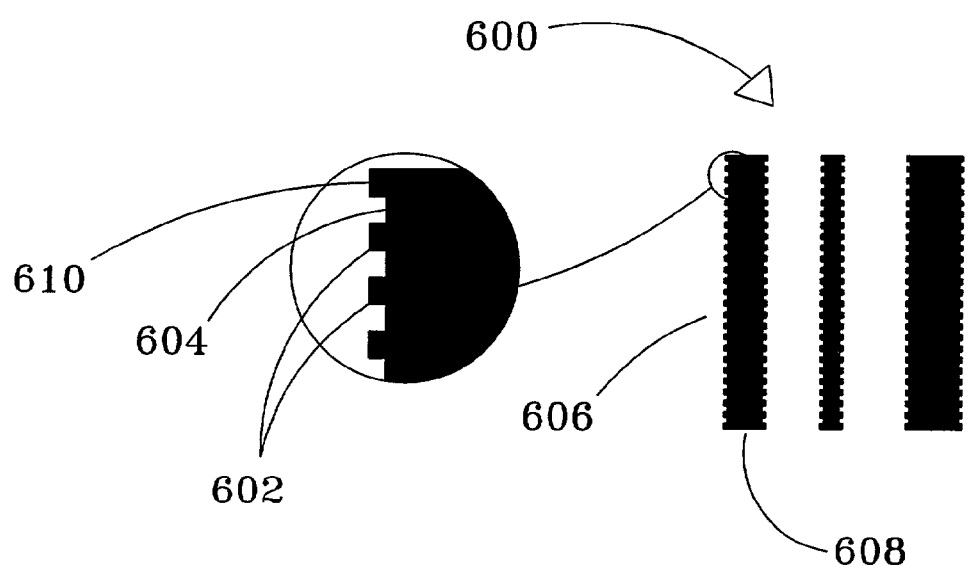
FIG. 6 is an illustration of a striated-but-filled barcode, similar to that of FIG. 5, but wherein the space between the horizontal striations is substantially filled.

A system and method is disclosed that optimizes the printing of barcodes by an inkjet printer. A plurality of techniques interact synergistically to produce sharper edges on barcode elements and to prevent barcode growth after ink application. The techniques address single pen printheads, multi-pen printheads, black ink barcodes, composite black ink barcodes and color barcodes.

FIG. 1, Prior Art, shows an enlarged view of a portion of a barcode 100, wherein characteristics of the barcode are exaggerated so that they are visible. The barcode is formed from a plurality of barcode elements 102. The barcode elements are flawed, in part because of curving edges resulting from errors in the timing of the firing of the print nozzles, misalignment of the print nozzles during printhead manufacture, and other imperfections. The flaws in the barcode elements can result in errors in reading the barcode. In particular, errors result because in some areas the gap between barcode elements is too great 104, while in other areas the gap between barcode elements is too little 106. As a result, the barcode may be unreadable, may required repeated attempt to be successfully read, or may produce an inaccurate reading.

FIGS. 2 and 3 show barcode elements 200, 300 formed by pixels printed by only the even and only odd nozzles of a printhead, respectively. Where a printhead has two columns of nozzles, numbered alternately from column to column and from top to bottom, a first column of nozzles may be considered to be the odd column, while a second column of nozzles may be considered to be the even column. Due to differences between the even and odd nozzles within the printhead, the barcode elements 200, 300 have subtle curves and other irregularities that can be discerned due to the enlargement and exaggeration of FIGS. 2 and 3. Such irregularities could be apparent to a barcode reader, because of the level of precision with which such machines operate.

FIG. 4 shows a one-column barcode 400, i.e. a barcode formed by printing with only one column of nozzles within the printhead. In this case, the one-column barcode comprises barcode elements 200 that were printed by use of only the even column of nozzles within the printhead. Alternatively, the barcode could have been printed by only the odd nozzles of the printhead. In a manner similar to FIGS. 2 and 3, the edges of the bar code elements are not straight, having been exaggerated in the illustration to allow visual observation of subtle flaws affecting a barcode reader. However, because each barcode element was printed by the same column of nozzles within the printhead, the width of each barcode element relative to the width of other barcode elements, and the distance between adjacent barcode elements, is precisely controlled. As a result, the one-column barcode is easily and accurately read by a barcode reader.

FIG. 5 shows a striated barcode 500 printed with only one column, such as only the even (or only the odd) nozzles of a printhead having two staggered columns of nozzles. Due to the staggered nature of the nozzles within the printhead, each barcode element 502 is formed of horizontal bars 504 alternating with horizontal spaces 506. The horizontal bars are printed with only the even nozzles (or only the odd nozzles) of the printhead. Because the columns of nozzles the printhead are staggered, and because the odd (or even) nozzles are not used, narrow spaces 506 exist between horizontal bars 504. However, because the width of the laser used in a barcode reading apparatus is wider than the horizontal spaces 506, the laser recognizes the outer end edges 508 of the horizontal bars 504 as the edge of the barcode. Since the alignment of pixels printed by only the even nozzles (or odd nozzles) can be controlled to a greater level of accuracy than the alignment of pixels printed by both the odd and even nozzles, the edge formed by the ends 508 of the horizontal bars 504 is sharper than an edge formed by the combined use of both the odd and even printhead nozzles.

FIG. 6 shows a striated-but-filled barcode 600 similar to the striated barcode 500. A primary difference between the striated barcode 500 and the striated-but-filled barcode 600 is that the space between horizontal bars printed by only the even (or only the odd) nozzles have been partially filled in with horizontal bars printed by only the odd (or only the even) nozzles. In many applications, filling most of the space between horizontal bars causes the barcode 600 to appear to a user, consumer or purchaser to be of a higher print quality than the striated barcode 500. It is not necessarily the case, however, that a barcode reader will differentiate between barcodes 500 and 600.

The length of the horizontal bars 602 printed by the even (or odd) nozzles is greater than the length of the fill-in bars 604 printed by the odd (or even) column of nozzles. As a result, the barcode element edges 606 of the vertical barcode elements 608 are formed by the end edges 610 of the longer horizontal bars 602. Because the alignment of pixels printed by the nozzles within one column (odd or even) on the printhead can be controlled with greater accuracy, the edge formed by the ends 610 of the horizontal bars 602 is typically sharper than if the shorter horizontal fill-in bars 604 were extended. Because the width of the laser is greater than the distance between horizontal bars 602, the laser perceives the edge of the barcode element to be the end edges 610 of the longer horizontal bars 602.

Figure 7:
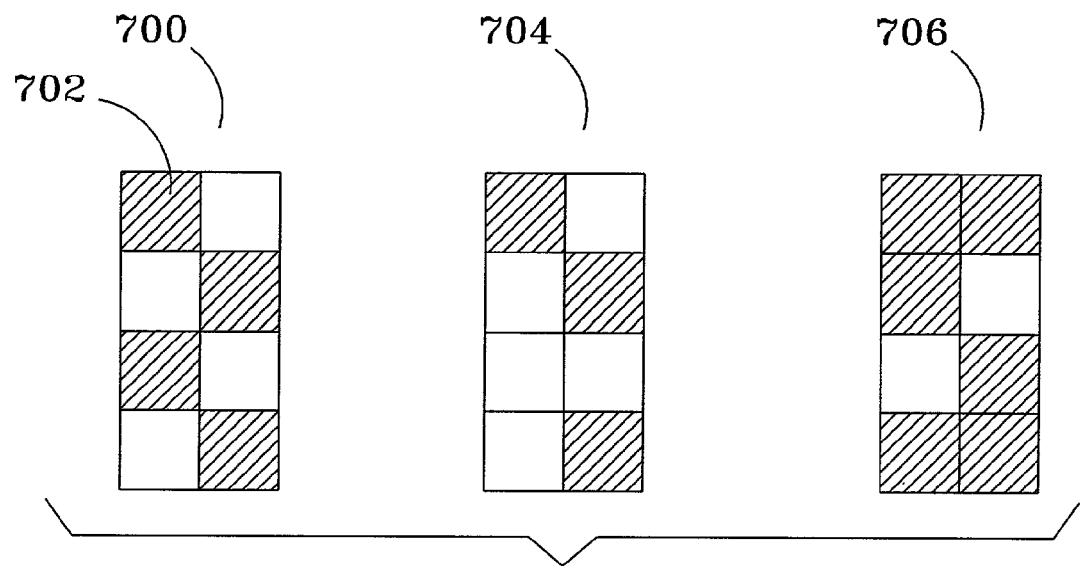
FIG. 7 is an illustration of a depletion matrix.

FIG. 7 shows exemplary depletion matrices 700, 704, 706 that may be used during the printing of a barcode or other print image. In the course of making firing decisions associated with individual pixels, the depletion matrix may be superimposed over the print image to be output. By printing only on those pixels indicted by both the print image and by the darkened squares 702 on the depletion matrix, the amount of ink used is reduced. The amount of the reduction can be controlled by alteration of the depletion matrix. For example, where 50% of the squares on the depletion matrix are dark, the ink used in the output of the print image resulting in the barcode is reduced by half.

Figure 8:
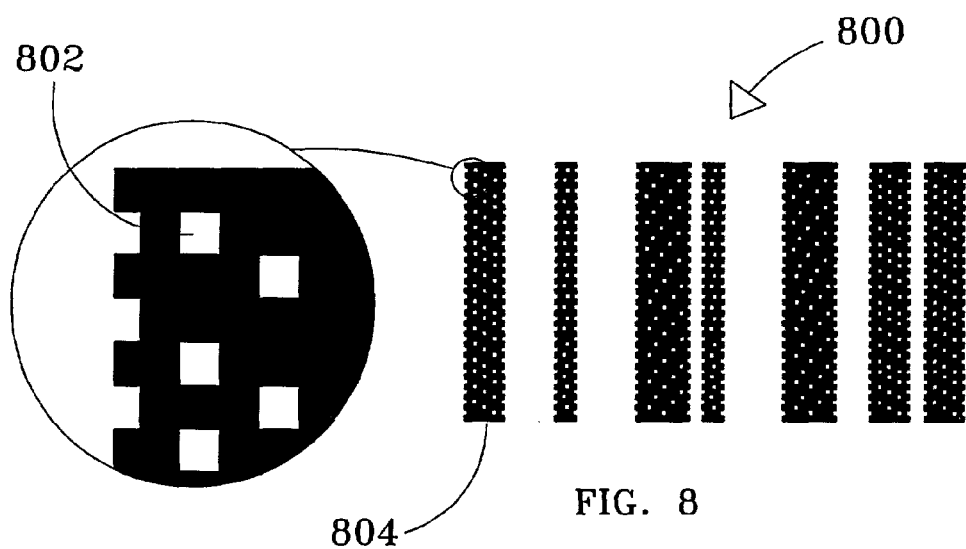
FIG. 8 is an illustration of a depletion barcode, wherein a depletion matrix has been used to remove some of the ink that might otherwise have migrated to produce swelling.

FIG. 8 shows a depletion barcode 800 formed by a print image modified by a depletion matrix, such as depletion matrix 700, as applied to a striated-but-filled barcode. A depletion barcode 800 may be printed using an appropriately selected depletion matrix applied to a one-column barcode, a striated barcode, a striated-but-filled barcode or other barcode type, as desired. A depletion matrix is selected that will result in removal of sufficient pixels to lessen the overall quantity of ink sufficiently to prevent excessive ink migration and barcode growth. A number of pixels 802 are removed from each depleted barcode element 804, thereby lessening the overall amount of ink applied in printing the barcode. By lessening the overall amount of ink applied in the printing process, the growth of the barcode elements after the ink is printed and before the ink dries is lessened. In many cases, ink migration tends to cover the areas which were not printed, due to the depletion matrix. Therefore, the barcode printed in this manner appears uniformly black.

Figure 9:
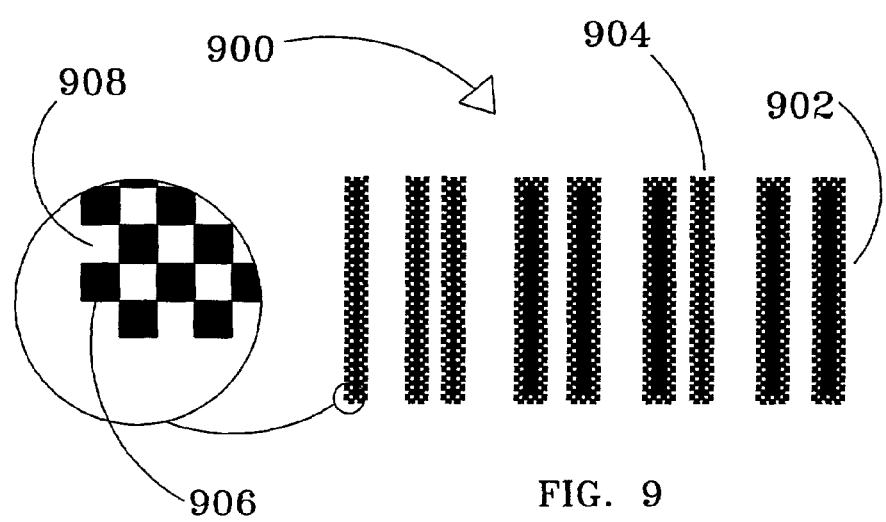
FIG. 9 is an illustration of a barcode, wherein an edge depletion matrix has been applied, thereby depleting the edges of barcode elements.

FIG. 9 shows an edge-depletion barcode 900, wherein a depletion matrix is applied only to the edges 902 of each barcode elements 904. Print and non-print regions 906, 908 are therefore defined in the edges of the barcode elements by the depletion matrix. As with the striated barcode 500, the width of the laser used in a barcode reader is greater than the width of the non-print regions 908. As a result, the non-print regions do not affect the readability of the barcode. However, by using non-print regions to limit the amount of ink used within the edges of the barcode elements, the edges 902 tend to result in less ink migration, swell less and maintain a sharper alignment.

In a first alternative, the portions of the edges of the barcode 900 not masked by the depletion matrix may be printed only with nozzles associated with the even (or odd) column of nozzles within the printhead. This tends to reduce error due to differences in nozzle alignment between different nozzle columns.

In a further alternative, a print mask may be associated with the edges of the barcode 900. Using the print mask, each edge may be printed only by the printhead moving in a single direction. This removes errors due to differences in print appearance related to printhead direction.

In a still further alternative, the edges of the barcode 900 may be printed only be one column of nozzles, and only when the printhead is moving in a single direction. Use of one column of nozzles interacts synergistically with the use of a single direction to result in a highly readable barcode.

Figure 10:
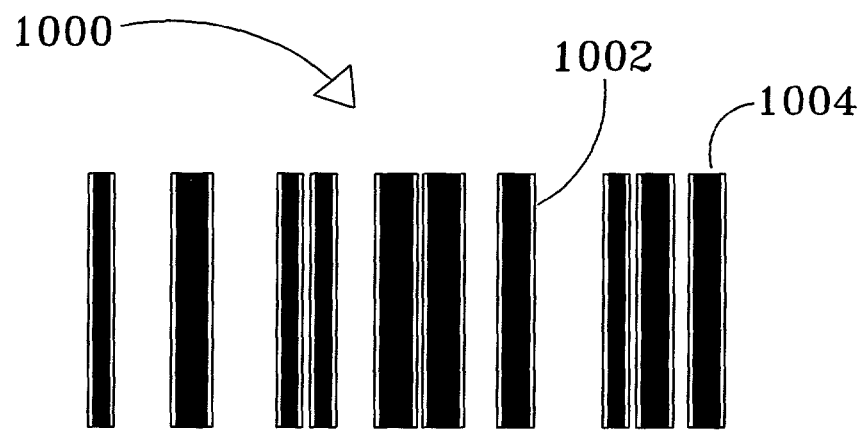
FIG. 10 is an illustration of an edge removal matrix, wherein the edges have been removed to utilize ink migration to result in a barcode element of the correct size.

FIG. 10 shows an edge-removed barcode 1000. An edge portion 1002 has been totally masked-out of each barcode element 1004. The edge portion is shown in outline for purposes of illustration only. By masking-out the edge, a vertical column one or more pixel wide that would otherwise have been printed is not printed. The number of pixels that are masked-out are roughly equal in volume to the area that the barcode element will swell due to ink migration. Accordingly, after the print image is applied, swelling will result in a barcode element having the correct width. The width of the edge portion removed may be a dependent upon the type of ink used, the media on which it is applied, the width of the barcode element and other factors.

Figure 11:
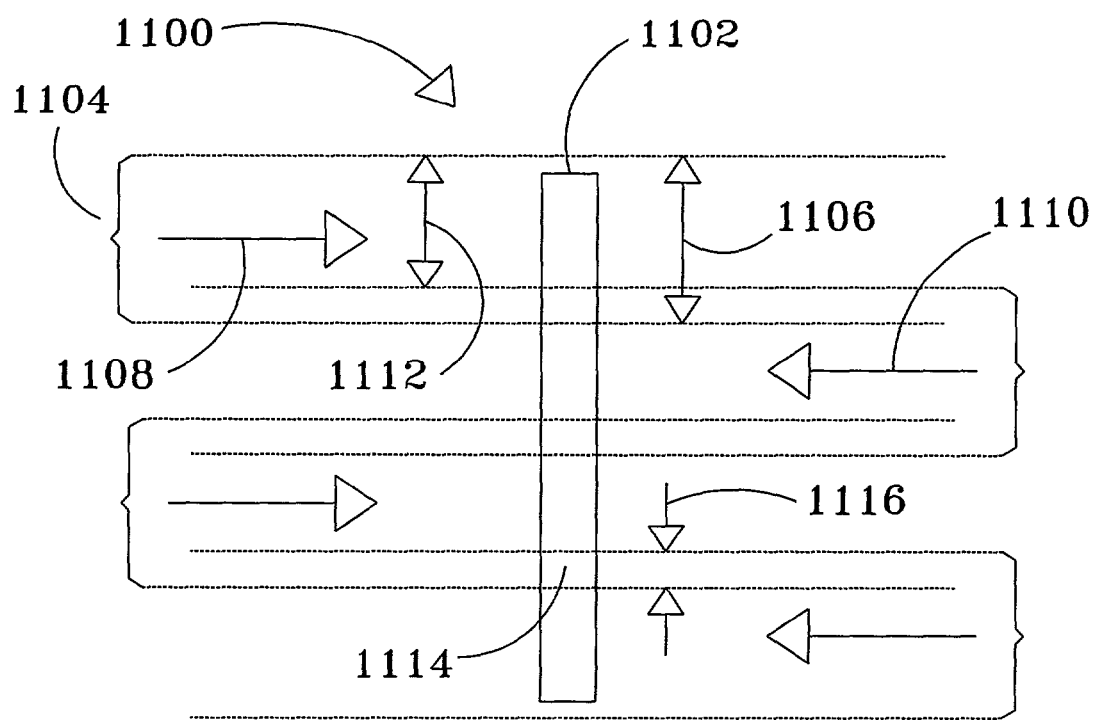
FIG. 11 is an illustration of a barcode element printed by means of an overlapping print process.

FIG. 11 shows a system 1100 for making an overlapping barcode element 1102 using a single-printhead, bi-directional printer. The printhead prints a swath 1104 having a width 1106, alternating between a first direction 1108 and a second direction 1110. The media is advanced a distance 1112, which is less than the width of the swath. As a result, a region of overlap 1114 has width 1116.

Pixels printed by the top and the bottom parts of printhead pens, i.e. pixels at the edges of the print swath, are associated with most directionality errors. By overlapping the edges of the print swaths, and splitting pixels within the overlapped areas between different parts of the pen, the defects induced by directionality errors are reduced. Additionally, ink-to-media interaction, such as ink migration, is limited. Printing the overlap region in two passes contained in two swaths, rather than all at once in a single swath, allows the ink some time to dry between applications, thereby cutting down on ink migration.

In one alternative, the application of a greater amount of ink to the region of overlap than to other portions of the barcode element may be beneficial. The application of additional ink can be considered to be "propletion," as opposed to "depletion," i.e. the application of a greater amount, as opposed to application of a reduced or depleted amount, of ink.

Figure 12:
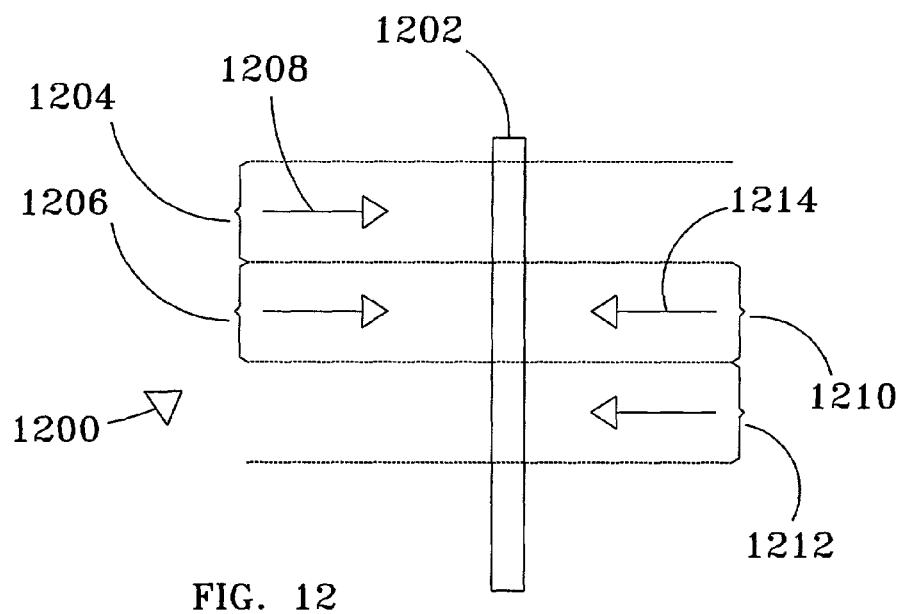
FIG. 12 is an illustration similar to that of FIG. 11, but using a two printhead system.

FIG. 12 shows a system 1200 for making a dual printhead overlapping barcode element 1202 using a bi-directional two-printhead print system. First and second swaths 1204, 1206 are printed in a first direction 1208, after which the media is advanced by approximately the amount printed by one printhead in each swath. Third and fourth swaths 1210, 1212 are then printed by printhead movement in a second direction 1214. Therefore, the region printed by the second swath is also printed by the third swath; accordingly, a swath passes in each direction over all locations on the barcode element 1202. A printing mask may is used to regulate the locations to which ink applied in each swath.

Figure 13:
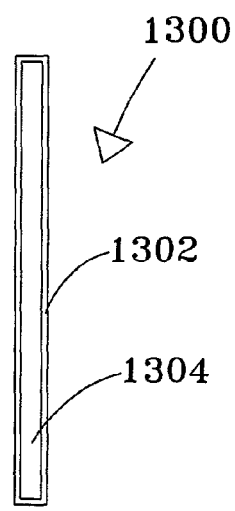
FIG. 13 is an illustration of a barcode element printed with pigment-based black edges and a composite black interior region.

FIG. 13 shows a barcode element 1300 printed with a perimeter of black ink 1302 that is pigment-based. The interior region 1304 is composite black (i.e. black formed from a mixture of cyan, magenta and yellow) that is die-based. Because pigment-based ink and die-based ink tend to resist mixing, the perimeter of pigment-based ink 1302 resists the expansion, swelling or migration of the ink forming the die-based interior region 1304. Accordingly, there is less ink migration and barcode element growth, and barcode defined by the print image has greater resolution.

Figure 14:
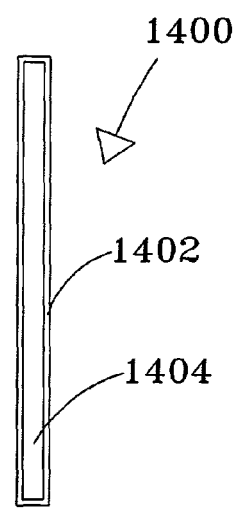
FIG. 14 is an illustration of a barcode element printed with a single color edge and a composite black interior region.

FIG. 14 shows a barcode element 1400 printed with a perimeter 1402 of cyan or alternate color and an interior region 1404 that is formed of composite black. Because the perimeter is formed from one color, the resolution is greater than would be the case if the perimeter was formed of composite black.

Figure 15:
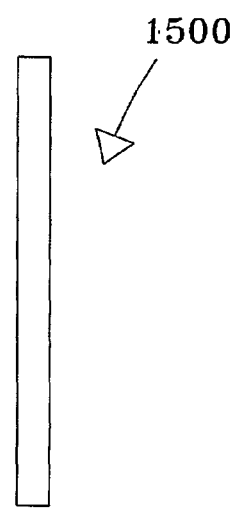
FIG. 15 is an illustration of a barcode emphasizing cyan, to reflect the red laser used in many barcode readers more effectively.

FIG. 15 shows a barcode element 1500 printed from of a mixture of cyan and other ink colors. The inks may be die-based, and the media may a glossy surface. Due to these conditions, some swelling may result. To reduce swelling of the barcode elements, one or more colors may be reduced, thereby emphasizing other colors. For example, where cyan is emphasized, the resulting color may deviate somewhat from composite black, i.e. the resulting barcode may include more cyan and less magenta and yellow than is required to make composite black. However, where the overall color emphasizes cyan, the red light of a red laser tends to be more fully absorbed than where magenta is emphasized.

Figure 16:
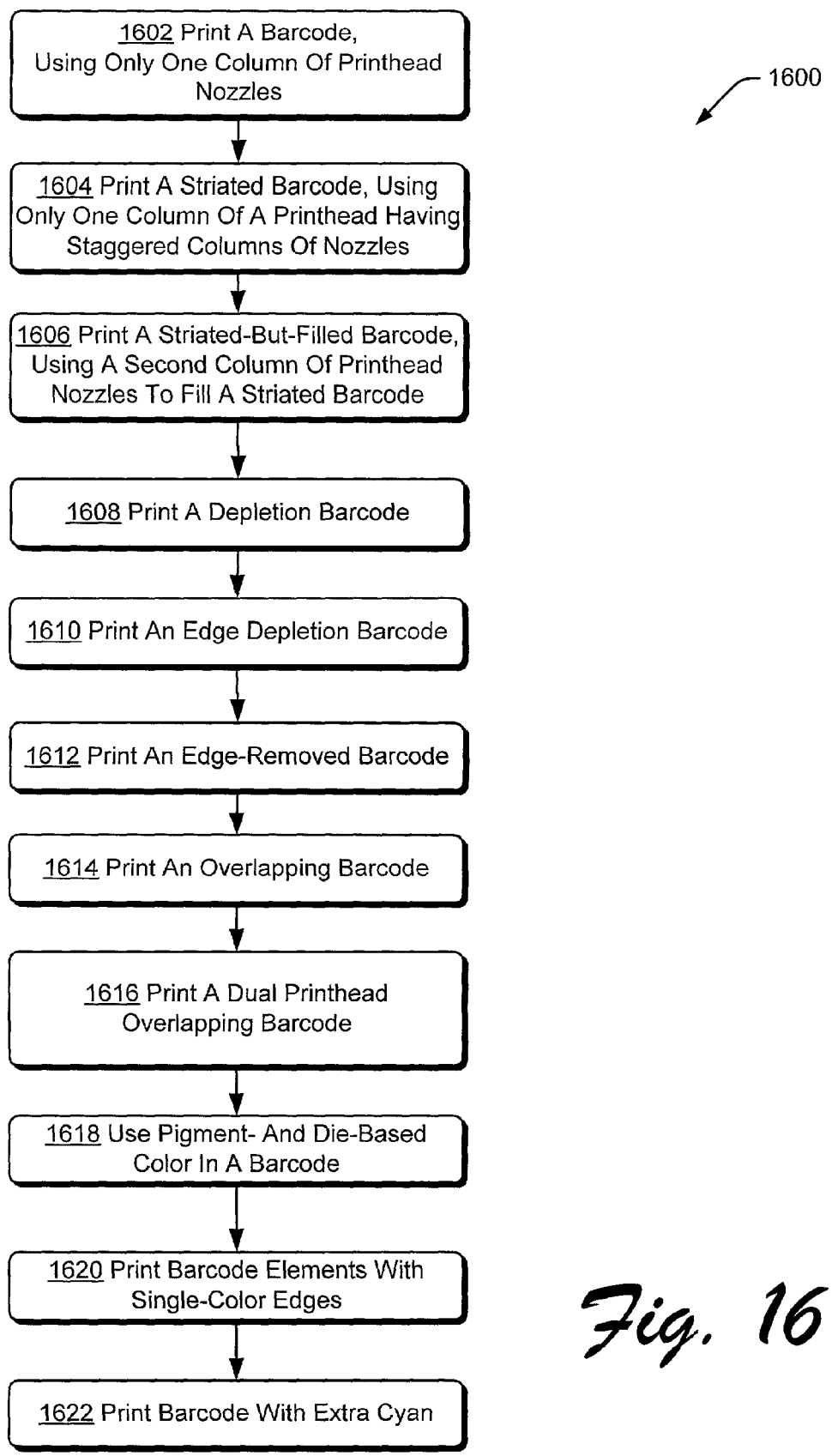
FIG. 16 is a flow chart showing steps by which one or more barcodes may be printed.

FIG. 16 shows a method 1600 by which at least one barcode may be printed. The at least one barcode includes characteristics consistent with at least one element, 1602 through 1622, as seen below.

At block 1602 a one-column barcode 400 is printed, using only one column, such as the even column, of nozzles.

At block 1604, a striated barcode 500 is printed, using only one column of nozzles from a printhead having staggered nozzles.

At block 1606, a striated-but-filled barcode 600 is printed, using one column of nozzles to print striated bars 602 having end edges 610 forming a highly readable edge 606. Fill-in bars 604 are formed by a second column of nozzles.

At block 1608, a depletion barcode 800 is printed, using a depletion matrix, such as depletion matrix 700.

At block 1610, an edge depletion barcode 900 is printed. The edge portions 902 may be printed with a depletion matrix. The edge portions may be printed with nozzles from more than one column or from only one column. Additionally, the edges may be printed when the printhead is moving in only one direction, or portions of the edges may be printed when the printhead is moving in each direction.

At block 1612, an edge removed barcode 1000 is printed. The edge portions of each barcode element are not printed, to compensate for ink migration, which results in ink deposition in the areas which are not printed.

At block 1614, an overlapping barcode 1102 is printed. A region of overlap 1114 is printed, in part on a first pass in a first direction by the printhead, and in part on a second pass in a second direction by the printhead. By overlapping the upper and lower portion of each swath, directionality errors are minimized. Optionally, a greater quantity of ink-propletion-is applied to the area of overlap.

At block 1616, a barcode comprising elements 1202 is printed using a bi-directional, two printhead system 1200.

At block 1618, a barcode is printed using both pigment- and die-based ink. In one implementation, a barcode element 1300 includes a perimeter 1302 of pigment-based black ink is printed about the perimeter of each barcode element. An interior portion 1304 of die-based composite black ink is used in an interior portion of the barcode element.

At block 1620, a barcode is printed from barcode elements 1400 having a perimeter 1402 of a single color, and an interior region 1404 formed of composite black.

At block 1622, a barcode is printed from barcode elements 1500, wherein cyan is emphasized to reflect a red laser used in a barcode reader.

Figure 17:
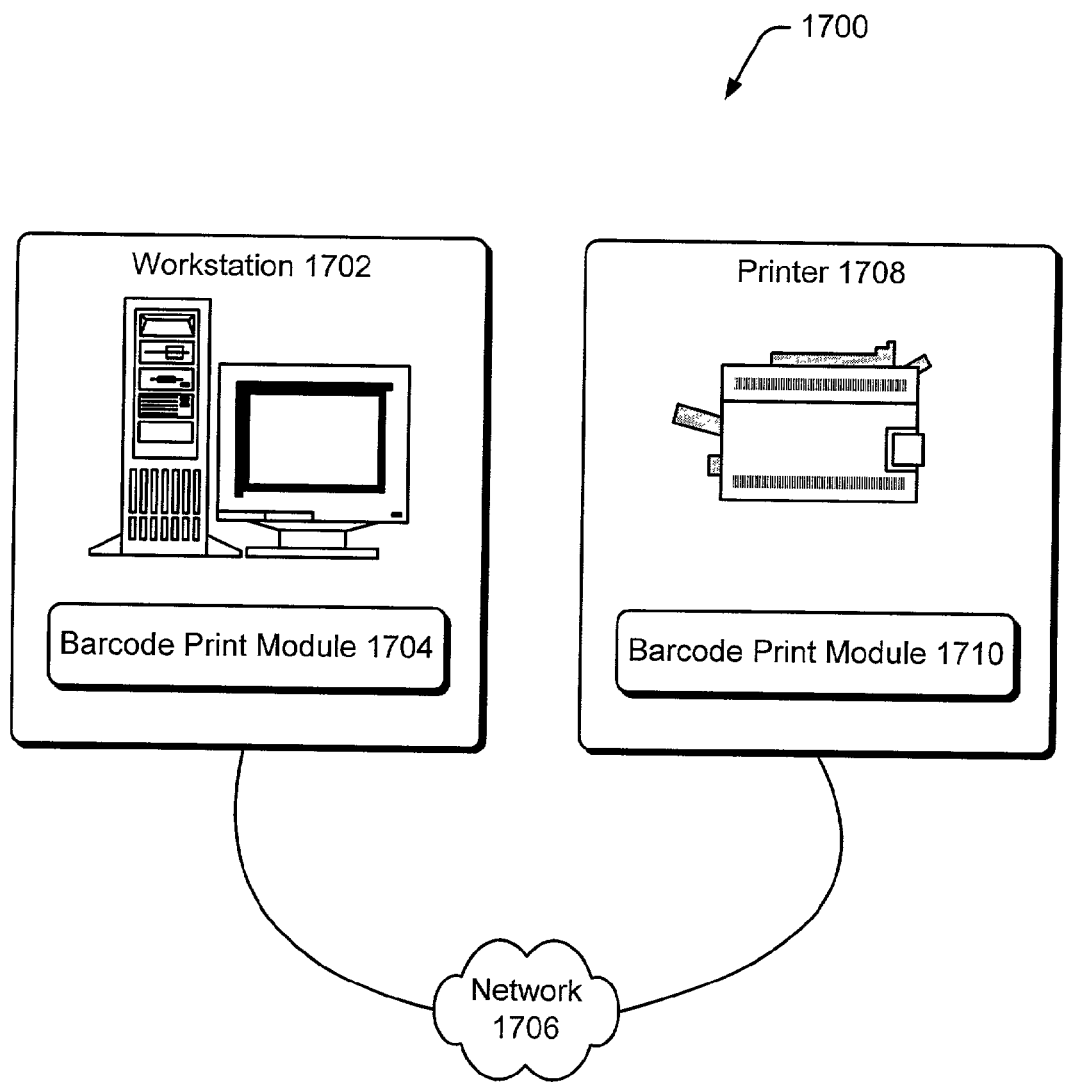
FIG. 17 is a diagram illustrating a system using the method of FIG. 16 to print barcodes.

FIG. 17 shows a print system 1700 for printing barcodes and other information. A workstation 1702 is attached to a printer 1708 through a network 1706. Optionally, either or both the workstation and the printer include a barcode print module 1704, 1710, respectively. The barcode print module implements one or more of the elements of the method 1600, seen above.

The above disclosure includes a plurality of techniques that interact synergistically to produce sharper edges on barcode elements and to prevent barcode growth after ink application. The techniques address single pen printheads, multi-pen printheads, black ink barcodes, composite black ink barcodes and color barcodes.

Although the disclosure has been described in language specific to structural features and/or methodological steps, it is to be understood that the appended claims are not limited to the specific features or steps described. Rather, the specific features and steps are exemplary forms of implementing this disclosure. For example, while in an exemplary print system, a printhead having even and odd nozzle columns has been described. Alternatively, more than two nozzle columns could be present. In that case, other means could be used to identify a single column of nozzles. Similarly, while the above methods and systems are suitable for independent use, it is also within the scope of the above disclosure that different portions of the above disclosure could be combined while printing a barcode.

The invention claimed is:

1. A method of printing a barcode comprising:
    printing a plurality of barcode elements, to thereby form the barcode, wherein the printing uses a printhead configured to include a first column of nozzles and a second column of nozzles, wherein the first and second columns of nozzles are located alongside one another;

printing a plurality of horizontal bars to thereby form each of the plurality of barcode elements, wherein printing the horizontal bars is performed using only the first column of nozzles; and printing edges of each of the barcode elements only while moving the printhead in a single direction.

2. The method claim 1, wherein printing the plurality of barcode elements comprises using a depletion matrix to reduce an amount of ink used to print each of the plurality of barcode elements.

3. The method claim 1, wherein printing the plurality of barcode elements comprises using a depletion matrix to reduce an amount of ink used to print edges of each of the plurality of barcode elements.

4. The method claim 1, wherein printing the plurality of barcode elements comprises totally masking-out an edge portion of a barcode element according to an amount of expected barcode growth.

5. The method claim 1, wherein printing the plurality of barcode elements comprises printing a perimeter of a barcode element with a pigment-based ink and an interior region of the barcode element with a die-based ink.

6. The method claim 1, wherein printing the plurality of horizontal bars comprises printing fill-in bars between the horizontal bars.

7. One or more computer-readable media, comprising computer-executable instructions for printing a barcode formed by a plurality of barcode elements, the computer-executable instructions comprising instructions for:

printing the plurality of barcode elements using a print head having a first column of nozzles and a further column of nozzles disposed alongside one another, the nozzles in the first column having a first characteristic printing pattern and the nozzles in the further column having a further characteristic printing pattern;

wherein printing the plurality of barcode elements includes printing a plurality of horizontal bars; and wherein printing the horizontal bars is performed using only the first column of the nozzles; and wherein printing edges of each of the barcode elements is performed only while moving the printhead in a single direction.

8. The one or more computer-readable media of claim 7, wherein printing the plurality of barcode elements comprises instructions for using a depletion matrix to reduce an amount of ink used to print each of the plurality of barcode elements.

9. The one or more computer-readable media of claim 7, wherein printing the plurality of barcode elements comprises instructions for using a depletion matrix to reduce an amount of ink used to print edges of each of the plurality of barcode elements.

10. The one or more computer-readable media of claim 7, wherein printing the plurality of barcode elements comprises instructions for printing edges of each of the plurality of barcode elements while using a printhead moving in a single direction.

11. The one or more computer-readable media of claim 7, wherein printing the plurality of barcode elements comprises instructions for totally masking-out an edge portion of a barcode element according to an amount of expected barcode growth.

12. The one or more computer-readable media of claim 7, wherein printing the plurality of barcode elements comprises instructions for printing a perimeter of a barcode element with a pigment-based ink and an interior region of the barcode element with a die-based ink.

13. The one or more computer-readable media of claim 7, wherein printing plurality of horizontal bars comprises instructions for printing the fill-in bars between the horizontal bars.

14. A system for printing barcodes formed by a plurality of barcode elements, comprising:

means for printing the plurality of barcode elements using a print head having a first column of nozzles and a further column of nozzles disposed alongside one another, the nozzles in the first column having a first characteristic printing pattern and the nozzles in the further column having a further characteristic printing pattern;

wherein the plurality of barcode elements is printed by a means for printing a plurality of horizontal bars;

wherein the horizontal bars are printed using only the first column of the nozzles; and wherein printing edges of each of the barcode elements is performed only while moving the printhead in a single direction.

15. The system of claim 14, wherein the means for printing the plurality of barcode elements comprises means for using a depletion matrix to reduce an amount of ink used to print each of the plurality of barcode elements.

16. The system of claim 14, wherein the means for printing the plurality of barcode elements comprises means for using a depletion matrix to reduce an amount of ink used to print edges of each of the plurality of barcode elements.

17. The system of claim 14, wherein the means for printing the plurality of barcode elements comprises means for printing edges of each of the plurality of barcode elements while using a printhead moving in a single direction.

18. The system of claim 14, wherein the means for printing the plurality of barcode elements comprises means for totally masking-out an edge portion of a barcode element according to an amount of expected barcode growth.

19. The system of claim 14, wherein the means for printing the plurality of barcode elements comprises means for printing a perimeter of a barcode element with a pigment-based ink and an interior region of the barcode element with a die-based ink.

20. The system of claim 14, wherein the means for printing the plurality of horizontal bars comprises means for printing the fill-in bars between the horizontal bars.

* * * * *